US005783118A

United States Patent [19]

Kolaini

[11] Patent Number: 5,783,118

[45] Date of Patent: Jul. 21, 1998

[54] METHOD FOR GENERATING MICROBUBBLES OF GAS IN A BODY OF LIQUID

[76] Inventor: Ali R. Kolaini, P.O. Box 3484, University, Miss. 38677

[21] Appl. No.: 887,126

[22] Filed: Jul. 2, 1997

[51] Int. Cl.[6] .......... G01F 3/04

[52] U.S. Cl. .......... 261/37; 261/36.1; 261/77; 261/119.1; 261/123; 261/DIG. 75

[58] Field of Search .......... 261/76, 77, 119.1, 261/123, 29, 120, 81, 36.1, 37, DIG. 75, DIG. 42; 210/220, 221.2, 758; 209/170

[56] References Cited

U.S. PATENT DOCUMENTS

| | | | |
|---|---|---|---|
| 543,411 | 7/1895 | Taylor | 261/DIG. 75 |
| 782,041 | 2/1905 | Mullen | 261/119.1 |
| 1,594,947 | 8/1926 | Hartman et al. | 261/123 X |
| 2,128,311 | 8/1938 | Mertes | 261/DIG. 75 |
| 3,202,281 | 8/1965 | Weston | 209/170 X |
| 3,547,811 | 12/1970 | McWhirter | 261/93 X |
| 3,671,022 | 6/1972 | Laird et al. | 261/93 X |
| 3,826,742 | 7/1974 | Kirk et al. | 210/220 X |
| 3,938,738 | 2/1976 | Nagel et al. | 261/77 X |
| 4,000,227 | 12/1976 | Garrett | 261/123 X |
| 4,019,983 | 4/1977 | Mandt | 261/76 X |
| 4,098,820 | 7/1978 | Couteau et al. | 261/36.1 X |
| 4,110,210 | 8/1978 | Degner et al. | 209/170 X |
| 4,112,025 | 9/1978 | Wilson et al. | 261/29 |
| 4,138,330 | 2/1979 | Garrett | 261/119.1 X |
| 4,152,259 | 5/1979 | Molvar | 210/220 X |
| 4,162,970 | 7/1979 | Zlokarnik | 210/220 X |
| 4,304,740 | 12/1981 | Cernoch | 210/220 X |
| 4,417,985 | 11/1983 | Keane | 210/758 X |
| 4,717,515 | 1/1988 | Forsyth et al. | 210/221.2 X |
| 4,928,525 | 5/1990 | Aderholt et al. | 364/509 X |
| 5,022,984 | 6/1991 | Pimley et al. | 210/221.2 X |
| 5,095,748 | 3/1992 | Gregory et al. | 364/509 X |
| 5,332,100 | 7/1994 | Jameson | 261/36.1 X |
| 5,465,848 | 11/1995 | Veh et al. | 261/76 X |

*Primary Examiner*—Richard L. Chiesa
*Attorney, Agent, or Firm*—Bacon & Thomas

[57] ABSTRACT

A process for generating microbubbles in a body of liquid includes immersing a tubular member defining a chamber having closed and open ends in a body of liquid with the closed end facing upward and the open end downward in the body of liquid; pressurizing the interior of chamber adjacent its closed end with a gas to maintain a level of liquid within the tubular member at a desired operating level; providing a liquid flow conduit conveying a liquid stream and having a terminal end within the chamber located such that the terminal end is fixed at a level just below the operating level of the liquid to thereby cause a stream of liquid flowing through the conduit to cause periodic oscillation of the level of liquid adjacent the conduit terminal end between positions just above and just below the terminal end, thereby causing periodic entrainment of gas from above the operating level of the liquid into the stream flowing through the conduit in the form of extremely small bubbles on the order to 30 μm or less that remain suspended in the liquid for a time sufficient to enable gasification of the liquid.

4 Claims, 2 Drawing Sheets

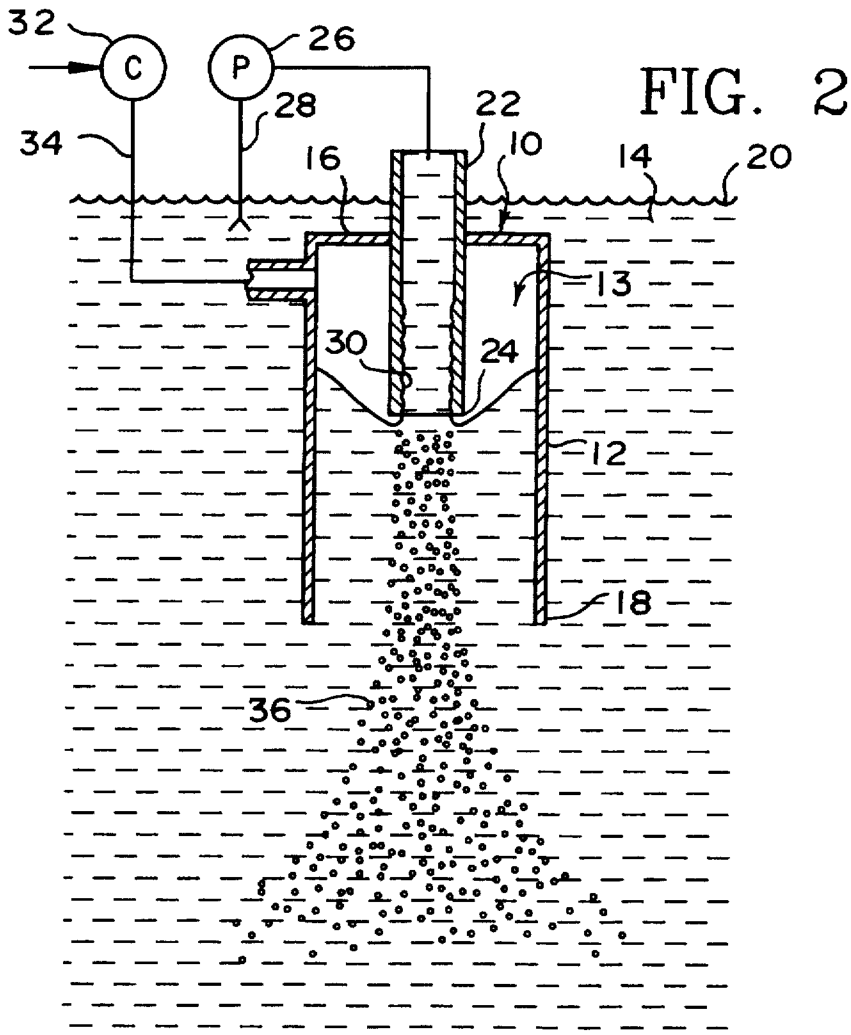
FIG. 2
FIG. 3
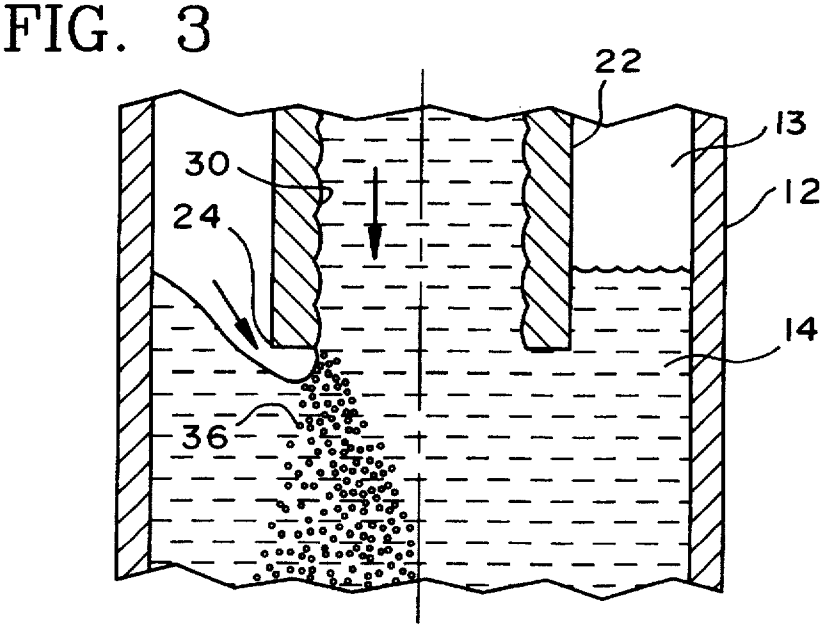

METHOD FOR GENERATING MICROBUBBLES OF GAS IN A BODY OF LIQUID

BACKGROUND OF THE INVENTION

1. Field of the Invention

This invention relates to a process for generating microbubbles of gas in a body of liquid, for example microbubbles of air in a body of water.

2. Discussion of Related Technology

Aeration of bodies of liquids has been carried out in accordance with the prior art using a variety of devices intended to entrain air or other gas in a moving stream of liquid, relying on the generation of turbulence at the gas-liquid interface area to generate bubbles in a liquid medium.

Such prior art systems tend to consume considerable energy due to the necessity of maintaining intense turbulence in the bubble generation zone. Exemplary prior art systems can be seen in U.S. Pat. No. 4,162,970 granted Jul. 31, 1979; U.S. Pat. No. 4,112,025 granted Sep. 5, 1978; U.S. Pat. No. 4,717,515 granted Jan. 5, 1988; U.S. Pat. No. 3,671,022 granted Jun. 20, 1972; and U.S. Pat. No. 4,304,740 granted Dec. 8, 1981.

In accordance with the aforementioned prior art devices, a gas is dispersed into a liquid using a jet of liquid injected into surrounding air or gas so that the gas is entrained in a rapidly moving liquid stream in a highly turbulent manner to thereby effectively disperse the gas in a liquid. The entrained bubbles will be of various sizes and the expectation is that, with sufficient turbulence, the agitation of the liquid will create small bubbles that will not rapidly coalesce within the body of liquid and rise to the surface to be released from the liquid, but will remain in the liquid long enough for some of the air or gas to be dissolved in the liquid. However, the prior art fails to describe a reliable process for generating extremely small bubbles that will remain suspended in the body of liquid for a substantial period of time to thereby disperse the gas within the body of liquid in an effective manner.

BRIEF SUMMARY OF THE INVENTION

It has been discovered that microbubbles can be generated in a body of liquid using relatively low energy.

In accordance with the invention, a chamber having a closed end and an open end is immersed in a body of liquid with the closed end facing upwardly and the open end facing downwardly. The interior closed end of the chamber is pressurized with gas, for example air, to lower the level of liquid within the chamber to a desired operating level between the closed and open ends of the chamber.

A liquid flow conduit extending into the chamber is provided and is oriented such that the terminal outlet end of the conduit extends slightly below the operating level of the liquid in the chamber.

Upon initiation of liquid flow through the liquid flow conduit, the level of liquid within the chamber in the area adjacent the terminal outlet end of the conduit is caused to oscillate from a position slightly above the terminal outlet to a position slightly below the terminal end. As the level of liquid drops slightly below the terminal end of the conduit adjacent the terminal end, gas above the liquid in the chamber is entrained into the stream of liquid flowing through the liquid flow conduit in the form of microbubbles that are extremely small, for example on the order of 30 μm or less.

Under steady state conditions, with liquid flowing through the liquid flow conduit and the operating level of the liquid maintained slightly above the terminal end of the conduit, the level of liquid in the chamber will periodically oscillate as described above in a continuous manner with periodic entrainment of gas into the stream of liquid flowing through the conduit.

This result is surprising and unexpected because the rate of liquid flow through the conduit is relatively low and the consumption of energy is likewise relatively low. The generation of the microbubbles resulting from the oscillating level of liquid at the terminal end of the liquid flow conduit unexpectedly creates a large quantity of bubbles that are sufficiently small so as to remain stable and suspended in the liquid without rapidly coalescesing and rising to the surface of the liquid.

BRIEF DESCRIPTION OF THE DRAWINGS

With reference to the appended drawings:

FIG. 2 illustrates the generation of microbubbles in accordance with the inventive process;

FIG. 3 is an enlarged vertical section view of the terminal end of the liquid flow conduit used to carry out the inventive process.

DETAILED DESCRIPTION OF THE INVENTION

Figure 1:
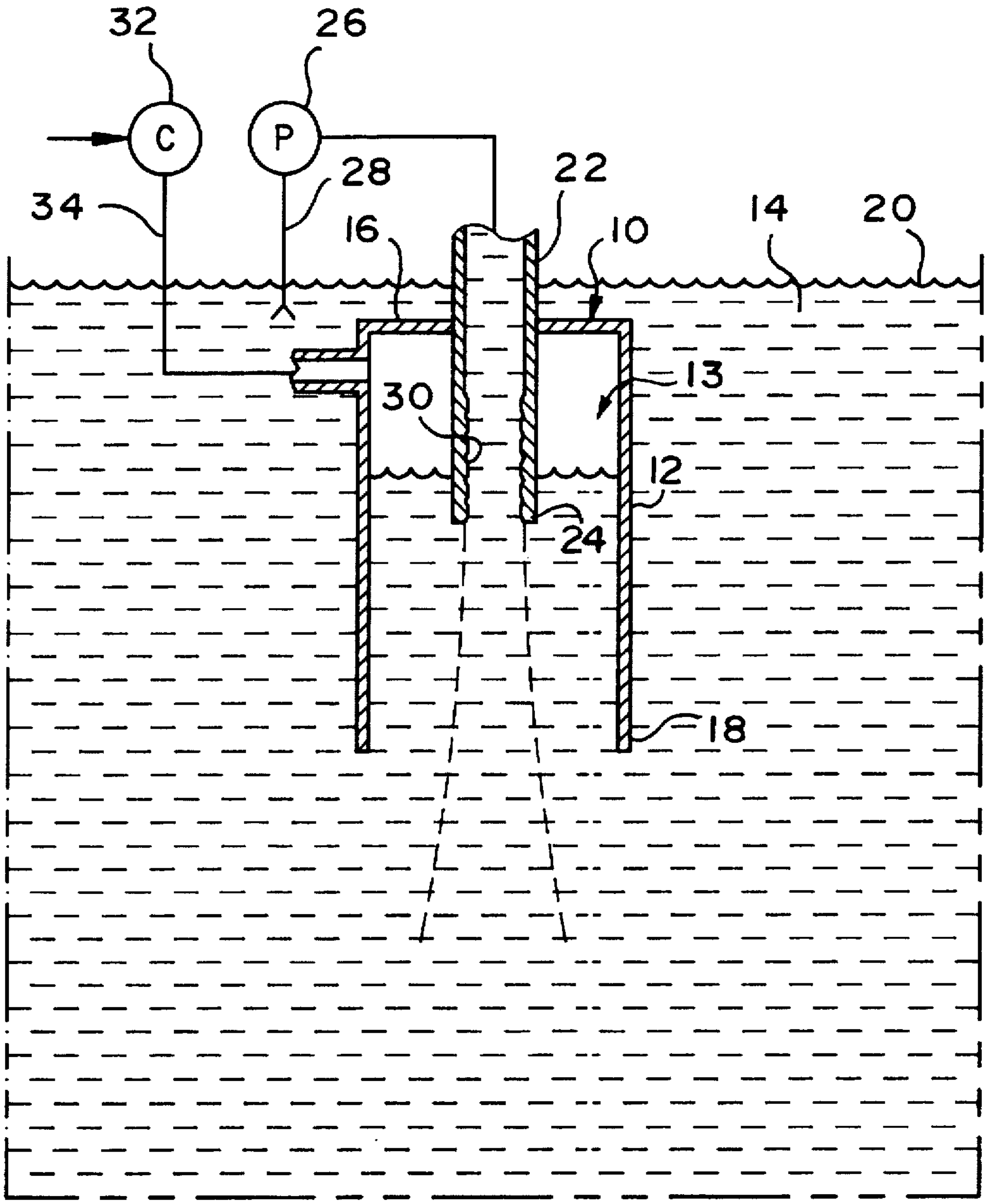
FIG. 1 is a vertical cross-section view schematically illustrating apparatus for carrying out the process in accordance with the invention.

With reference to FIG. 1, apparatus for carrying out the process in accordance with the present invention is illustrated schematically, wherein a microbubble generator 10 includes a member 12 defining a chamber 13 immersed in a body of liquid 14 and having a closed end 16 and an open end 18. The open end 18 is directed downwardly in the body of liquid 14 and the closed end 16 of the chamber may be below the surface 20 of the body of liquid 14.

The member 12 may have any desired cross-section, for example circular, square, oblong or any other geometric cross-sectional shape that will sustain or contribute to the oscillation of the operating level of liquid adjacent the terminal outlet end of the liquid flow conduit to be described below. In the preferred embodiment, the member 12 is circular in cross-section.

The longitudinal axis of the member 12 extends in a generally vertical direction, as illustrated, and the transverse cross-sectional area and length of the chamber 13 are not critical to the extent that the size and shape of the chamber 13 has not been observed to have a pronounced effect on the ability of the apparatus to generate microbubbles in the body of liquid 14. The member 12 and the liquid flow conduit 22 described below could be inclined relative to the vertical and it is contemplated that the use of the term "vertical" with respect to the member 12 and the conduit 22 extends to inclinations of the members away from vertical as well, although obviously it would not extend to a completely horizontal position because the chamber 13 would no longer be located in a closed end of the member 12.

A liquid flow conduit 22 extends through the upper end of the member 12 into chamber 13, for example through the closed end 16 in the preferred embodiment, and includes a terminal end 24 located within the chamber 13 at a position to be described in more detail below.

A liquid pump 26 having an inlet line 28 extending into the body of liquid 14, which may be water for example, circulates liquid from the body of liquid 14 through the liquid flow conduit 22 at a flow rate that will be described below. The source of liquid may be any suitable source, of course, although the body of liquid itself usually will be the most convenient.

Liquid flow conduit 22 may include a rough internal surface or other irregularities 30 adjacent the conduit terminal end that are intended to create flow perturbations in the liquid passing through liquid flow conduit 22. Liquid flow conduit 22 has a cross-sectional area that is smaller than the cross-sectional area of the chamber 13 so that a space exists between the outer side of the liquid flow conduit 22 and the inner walls of the chamber 13, as illustrated.

A gas pump or compressor 32 supplies pressurized gas, for example air, through conduit 34 to the upper interior end of the chamber 13 to lower the level of liquid within the chamber 13 to an operating level that is closely adjacent the terminal end 24 of liquid flow conduit 22. That is, differential gas pressure within the upper end of the chamber 13 is maintained by the pump 32 so that the liquid operating level is precisely located very closely adjacent and above the terminal end 24 of the liquid flow conduit 22. It is critical in accordance with the present invention that the operating level of liquid in the chamber 13 be not maintained at a level below the terminal end 24 of the liquid flow conduit 22 nor at such an elevated level that the desired oscillating effect to be described below cannot be achieved.

In carrying out the inventive method, liquid is caused to flow through the liquid flow conduit 22 by actuation of pump 26 by any suitable means, for example an electric, manual or other type of motor, at a flow rate that will cause the operating level of liquid within the chamber 13 to become unstable adjacent end 24 of conduit 22 and to momentarily drop slightly below the terminal end 24 of the conduit 22, as illustrated in FIGS. 2 and 3. However, the flow rate of liquid and the operating level of liquid within the chamber 13 are selected such that, under steady state conditions, the level of liquid in the chamber 13 adjacent end 24 periodically oscillates between a position just above the terminal end 24 and just below the terminal end. This oscillation effect in the immediate area adjacent the terminal end 24 is critical to the operation of the invention and the achievement of the generation of microbubbles in the body of liquid 14. It is to be understood that the term "periodic" as used herein encompasses a regular, classic periodic action at an observable frequency as well as a variable periodic or irregular periodic series of events.

As shown in FIGS. 2 and 3, the oscillation of the level of liquid within the chamber 13 at end 24 starting from the operating level causes periodic entrainment of gas in the form of bubbles 36 in the stream of liquid circulating through the liquid flow conduit 22 or more precisely at the interfaces of the gas, moving liquid stream and static liquid 14 for so long as the level of liquid within the conduit 22, or any portion thereof, drops below the terminal end 24 of the conduit 22. Upon periodic raising of the liquid level in the chamber 13 above the terminal end 24, the generation of the bubbles 36 momentarily ceases until the liquid level again drops below the terminal end 24 of the conduit 22. This continuous oscillating action of the level of liquid within the chamber 13 adjacent the terminal end 24 of the conduit 22 has been found to periodically generate large quantities of gaseous bubbles that are extremely fine in size, on the order to 30 μm or less.

This result is surprising in view of the low level of energy required to generate the microbubbles. In contrast to prior art devices requiring generation of high intensity turbulence at a liquid-air interface zone, a gentle flow of liquid through conduit 22 sufficient to cause oscillation of the level of liquid in the chamber 13 from an operating level adjacent the terminal end 24 of the conduit 22 has been observed to create large quantities of microbubbles 36 during the oscillating action. The precise mechanism whereby the microbubbles are created is not clearly understood at this time but it has been observed that the bubbles are sufficiently small so as to remain suspended in the liquid 14 for some time and not coalesce or rise to the surface of the liquid shortly after they are formed. This results in good gasification of the body of liquid in which the bubbles are generated.

In a preferred embodiment, the liquid 14 is water and the gas circulated by the pump 32 is air, to thereby result in generation of microbubbles of air 36 which oxygenate the water 14. It is believed that the principle of microbubble generation in accordance with this invention can be utilized with other liquids using other gases that may be entrained in a liquid.

The surface irregularities 30 in the conduit 22, if utilized, create perturbations in the flow of liquid flowing through the conduit to enhance the oscillation of the operating level of liquid in the chamber 13 adjacent the terminal end 24 of the conduit 22. More specifically, laminar flow through conduit 22 is not always desirable, although the use of surface irregularities 30 may not always be required, depending upon the nature of the body of liquid 14 and the gas supplied through conduit 34. Obviously, enhancement of the local oscillation of the liquid level at the terminal end 24 of conduit 22 is of critical importance in any case.

In an experimental procedure, apparatus consistent with the system illustrated in the drawings was created in which the outer member 12 was a cylindrical tube 2.5 cm in diameter and the flow conduit 22 was 1 cm in diameter. The materials used to form the chamber 13 and liquid flow conduit 22 were thin walled transparent synthetic resin which enabled observation of the liquid operating level and oscillation of the level of the liquid in the chamber 13 under operating conditions. The liquid circulated through the conduit 22 was water at a velocity of 1.5 m/sec. and the operating level of the liquid in the chamber 13 was established by air pressure at just slightly above the terminal end 24 of the conduit 22. The entire member 12 was immersed in a body of water. Upon circulation of the water through the conduit 22, the level of water in the chamber 13 was seen to oscillate or dip at certain areas thereof between a position just slightly below the terminal end 24 of the conduit 22 and a position just slightly above the terminal end. When the liquid level dropped below the terminal end 24, a substantial puff of microbubbles of air was observed to be entrained in the stream of water flowing through the conduit 22, this periodic puffing action continuing throughout the period that water was circulated through conduit 22 to generate the oscillating action of the water in the chamber 13.

It is theorized for the experimental apparatus that the frequency of oscillation f of the liquid level in the chamber 13 can be expressed as:

$$f=f(\Delta P, Ri, Ro, Vj)$$

where:

$\Delta P$ is the differential pressure of gas above the operating level of liquid in the chamber 13;

Ri and Ro are the inner and outer radii, respectively of the chamber 13 and the conduit 22; and Vj is the velocity of flow of liquid through the conduit 22.

In the example given above, a frequency f of 1.5 Hz was observed.

During the experiment, the liquid level within the chamber 13 adjacent the end 24 of conduit 22 tended to drop below the terminal end 24 of conduit 22 in localized areas only and not completely around the terminal end all at once. The oscillating effect was clearly observable as long as the operating level of liquid was maintained closely adjacent and just above the terminal end 24 of conduit 22 so that it was necessary for the liquid flow stream moving through the conduit 22 to lower the level of the liquid slightly below the terminal end 24 in a periodic or non-continuous manner.

It is to be understood that the example described herein is exemplary only and that variations in the steps described for carrying out the process as well as the apparatus described for carrying out the process may be varied in accordance with principals that are known to those skilled in the art. The scope of the invention is thereby not limited to the exemplary steps or apparatus described herein.

I claim:

1. A method for generating microbubbles of gas in a body of liquid, comprising:

immersing a member defining a chamber having interior walls, a closed end and an open end within a body of liquid with the open end facing downwardly in the liquid so that liquid of said body of liquid is present in the chamber;

pressurizing the interior of the chamber adjacent its closed end with a gas to establish an operating level of liquid within the chamber between the closed and open ends of the chamber;

providing a liquid flow conduit extending into the interior of the chamber and extending downwardly into the liquid within the chamber, the conduit having a terminal outlet end disposed below and closely adjacent the liquid operating level;

said liquid flow conduit being smaller in cross-sectional area than the cross-sectional area of the chamber so as to be spaced from the interior walls of the chamber;

causing a stream of liquid to flow through the liquid flow conduit at a flow rate sufficient to cause periodic oscillation of at least a part of the liquid level adjacent the conduit terminal outlet end between a level just above the terminal outlet end and a level just below said terminal outlet end, to thereby periodically entrain gas from above the liquid level in the chamber into the stream of liquid exiting the liquid flow conduit in a form of microbubbles; and continuing the flow of liquid through the liquid flow conduit, the oscillation of the level of the liquid in the chamber and the periodic entrainment of gas for a time sufficient to produce a desired quantity of microbubbles in the body of liquid.

2. The method for generating microbubbles according to claim 1, including generating flow perturbations in the liquid exiting the liquid flow conduit adjacent the terminal outlet end of the liquid conduit.

3. The method for generating microbubbles according to claim 1, wherein said liquid is water and said gas is air.

4. The method for generating microbubbles according to claim 1, wherein the size of the microbubbles is on the order to 30 μm or less.

* * * * *